UNITED STATES PATENT OFFICE.

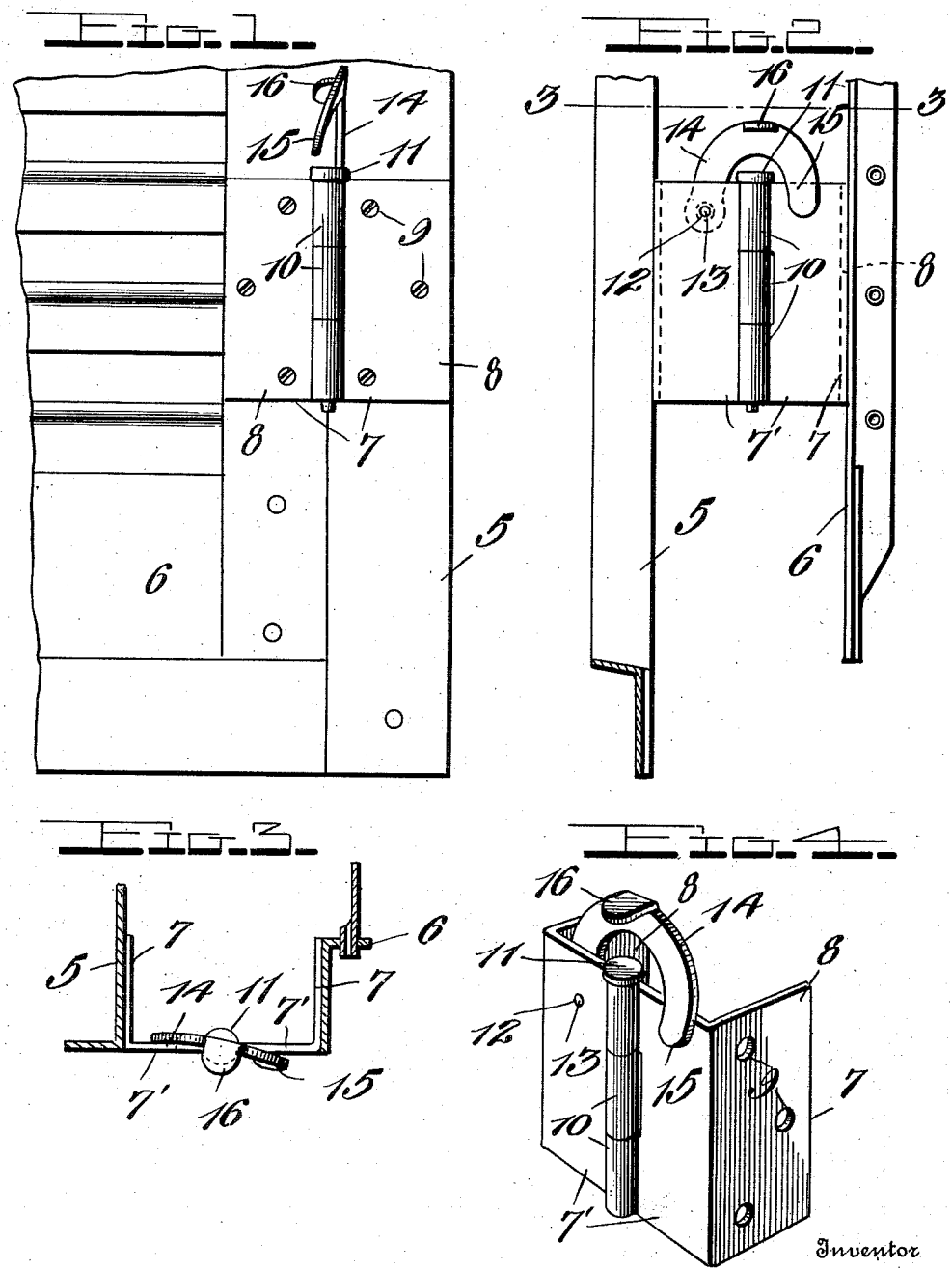

FRIEDERICH WM. BECKER, OF NEW ATHENS, ILLINOIS.

LOCK-HINGE.

1,018,691. Specification of Letters Patent. Patented Feb. 27, 1912.

Application filed May 11, 1911. Serial No. 626,433.

*To all whom it may concern:*

Be it known that I, FRIEDERICH WILLIAM BECKER, a citizen of the United States, residing at New Athens, in the county of St. Clair and State of Illinois, have invented certain new and useful Improvements in Lock-Hinges, of which the following is a specification, reference being had to the accompanying drawings.

This invention relates to hinge locks and more particularly to a lock for shutter hinges whereby the shutters may be held in their open positions.

The primary object of the present invention is to provide a locking device for shutter hinges which is of extremely simple construction, may be manufactured at small cost, and can be easily and quickly manipulated to lock or release the shutter.

Still another object of the invention is to provide a shutter hinge, and a locking member which is adapted to coact with said hinge and to engage the movable hinge leaf secured to the shutter to hold the shutter against movement.

With the above and other objects in view, the invention consists of the novel features of construction, combination and arrangement of parts hereinafter fully described and claimed, and illustrated in the accompanying drawings, in which—

Figure 1 is a side elevation of a portion of a window shutter and frame therefor showing my improved hinge lock, the shutter being closed; Fig. 2 is an edge elevation, the shutter being open and the lock shown in its operative position; Fig. 3 is a section taken on the line 3—3 of Fig. 2; and Fig. 4 is a detail perspective view of the hinge having my improved lock applied thereto.

Referring in detail to the drawing 5 designates a frame which may be either of wood or metal in which the shutter 6 is mounted. The shutter hinge comprises two similar leaves or plates 7 which are bent or flanged as indicated at 8 and provided with the screw receiving openings 9 whereby they may be attached to the frame and the shutter respectively. The hinge leaves are provided with the usual knuckles 10 through which the pintle 11 is adapted to be disposed to pivotally connect the leaves. The portions 7' of the hinge leaves upon which the knuckles are formed are closely engaged when the shutter is closed as shown in Fig. 1. Each of these portions 7' of the hinge leaves is provided adjacent its upper end with an opening 12 one of which is adapted to receive the screw 13 upon which the locking plate 14 is pivotally mounted. This locking plate is of substantially semicircular form and has its free end portion bent out of the plane of the pivoted portion of the plate or offset as shown at 15, for engagement with the inner face of the movable hinge leaf which is secured to the shutter, when the shutter is in its open position as shown in Fig. 2. A finger plate 16 is formed on the locking plate by means of which said plate may be readily moved to its locking position or lifted so that the shutter may be closed.

In the operation of my improved locking device, the shutter is moved to its open position against the wall of the building so as to dispose the portions 7' of the hinge leaves in substantially the same plane. The locking plate is then swung downwardly upon the upper end of the movable plate which is carried by the shutter so that the offset portion 15 of the locking plate engages upon the opposite side of the movable hinge leaf to that of the stationary plate on which the locking leaf is pivotally mounted. It will thus be seen that the shutter is securely held in its open position so that the wind will not blow the same closed, thus avoiding breakage of the shutter and the glass panes of the window sash. The device is extremely simple, and may be easily and quickly operated to securely hold the shutters against movement. By providing both of the leaves of the shutter hinges with one of the openings 12, the locking plate may be readily attached to either the left or right hand hinge, without requiring any change in the form of said plate.

From the foregoing it is believed that the construction and operation of my improved locking device will be readily understood. The movable locking plates may be manufactured at small cost and readily attached to the hinges without necessitating the employment of skilled labor. The device is also extremely durable and highly efficient in practical use.

Having thus described the invention what is claimed is:—

The combination with the two leaves of a hinge; of a locking device therefor, comprising a crescent shaped plate of sheet metal twisted to bring the two ends into obliquely disposed planes, means to pivotally connect one end of the plate and one of the hinge leaves, with the medial portion of the plate extending in an arch over the hinge pintle and the free end of the crescent engaging on the opposite side of the second hinge leaf, and a finger piece angularly extending from said medial portion of the plate.

In testimony whereof I hereunto affix my signature in the presence of two witnesses.

FRIEDERICH WM. BECKER.

Witnesses:
 EDWARD KOCH,
 FRED SCHOEPP.